United States Patent
Yamauchi et al.

(10) Patent No.: US 7,090,607 B2
(45) Date of Patent: Aug. 15, 2006

(54) HYBRID TRANSMISSION

(75) Inventors: Yasuhiro Yamauchi, Kanagawa (JP); Toshikazu Oshidari, Kanagawa (JP); Keyvan Kargar, Versailles (FR); Yves Pichon, Boulogne Billancourt (FR)

(73) Assignees: Nissan Motor Co., Ltd., Yokohama (JP); Renault s.a.s. societe par actions simplifiee, Boulogne-Bilancourt (FR)

( * ) Notice: Subject to any disclaimer, the term of this patent is extended or adjusted under 35 U.S.C. 154(b) by 38 days.

(21) Appl. No.: 10/755,402

(22) Filed: Jan. 13, 2004

(65) Prior Publication Data

US 2005/0101425 A1 May 12, 2005

(30) Foreign Application Priority Data

Jan. 17, 2003 (JP) .............................. 2003-009206

(51) Int. Cl.
*F16H 3/72* (2006.01)
(52) U.S. Cl. ........................................................ 475/5
(58) Field of Classification Search .................... 475/5, 475/10
See application file for complete search history.

(56) References Cited

U.S. PATENT DOCUMENTS

| | | | |
|---|---|---|---|
| 5,558,895 A | 9/1996 | Boyhan | |
| 5,935,035 A | 8/1999 | Schmidt | |
| 6,625,524 B1 * | 9/2003 | Yamaguchi et al. | 701/22 |
| 6,732,526 B1 * | 5/2004 | Minagawa et al. | 60/706 |
| 6,852,053 B1 * | 2/2005 | Nakano et al. | 475/5 |
| 6,887,175 B1 * | 5/2005 | Yamauchi et al. | 475/10 |
| 6,910,981 B1 * | 6/2005 | Minagawa et al. | 475/5 |
| 2002/0036106 A1 | 3/2002 | Hanyu et al. | |

FOREIGN PATENT DOCUMENTS

| | | |
|---|---|---|
| DE | 199 09 424 A1 | 8/2000 |
| EP | 1 160 117 A2 | 12/2001 |
| EP | 1279544 * | 1/2003 |
| EP | 1 426 223 A2 | 6/2004 |
| FR | 2 774 039 A1 | 7/1999 |
| JP | 11-301291 A | 11/1999 |
| JP | 3330900 B2 | 7/2002 |

* cited by examiner

*Primary Examiner*—Ha Ho
(74) *Attorney, Agent, or Firm*—Foley & Lardner LLP

(57) ABSTRACT

A hybrid transmission connected with a prime power source, including an input member for receiving power input from the prime power source, a two degree-of-freedom gear mechanism having a first axis and including at least four rotating members that are associated to rotate about the first axis, a first motor/generator having a second axis aligned with the first axis of the two degree-of-freedom gear mechanism, and a second motor/generator having a third axis offset from and parallel to the first axis. The first motor/generator is drivingly connected with the first rotating member of the two degree-of-freedom gear mechanism. The second motor/generator is drivingly connected with the second rotating member of the two degree-of-freedom gear mechanism.

13 Claims, 6 Drawing Sheets

HYBRID TRANSMISSION

BACKGROUND OF THE INVENTION

The present invention relates to a hybrid transmission adapted for a hybrid electric vehicle (HEV) in which multiple power sources including an engine and a motor are provided. More specifically, the present invention relates to a hybrid transmission capable of continuously and variably transmitting the power output from the power sources using a differential device such as a planetary gear set.

U.S. Pat. No. 5,935,035 (corresponding to Japanese Patent No. 3,330,900) discloses a hybrid transmission in which rotating members constituting a differential device are connected with a prime power source, a drive system and two motor/generators. The two motor/generators are arranged in an axial direction of the hybrid transmission.

SUMMARY OF THE INVENTION

However, in the above-described related art having the two axially arranged motor/generators, an axial dimension of the hybrid transmission is increased, whereby installation ability thereof to a vehicle body will be deteriorated. Further, in the axial arrangement of the two motor/generators, the amount of overhang of one motor/generator unit which is disposed away from the prime power source is increased and supported in the form of a cantilever. This causes deterioration of the mounting strength of the hybrid transmission, thereby resulting in lack of rigidity of the entire hybrid transmission.

It is an object of the present invention to provide a hybrid transmission capable of preventing deterioration of installation ability thereof to a vehicle body which will be caused due to an increased axial dimension thereof, and suppressing the deterioration of the mounting strength which will be caused due to the cantilever supporting structure of one of the motor/generator unit, to thereby avoid the lack of the rigidity of the hybrid transmission.

In one aspect of the present invention, there is provided a hybrid transmission comprising:

a two degree-of-freedom gear mechanism having a first axis and including at least four rotating members that are associated to rotate about the first axis and include a first rotating member and a second rotating member, the two degree-of-freedom gear mechanism being constructed such that, when rotation conditions of any two of the at least four rotating members are determined, rotation conditions of the remainder of the at least four rotating members are determined depending thereon, the two degree-of-freedom gear mechanism being adapted for receiving power input from a prime power source and delivering power output from the two degree-of-freedom gear mechanism;

a first motor/generator having a second axis aligned with the first axis, the first motor/generator being drivingly connected with the first rotating member of the two degree-of-freedom gear mechanism via a hollow shaft; and a second motor/generator having a third axis offset from and parallel to the second axis, the second motor/generator being drivingly connected with the second rotating member of the two degree-of-freedom gear mechanism via a central shaft which extends through the hollow shaft and the first motor/generator, the first and second motor/generators being disposed on one side of the two degree-of-freedom gear mechanism in a direction of the first axis, the prime power source being disposed on an opposite side of the two degree-of-freedom gear mechanism in the direction of the first axis.

In a further aspect of the invention, there is provided a hybrid transmission comprising:

a two degree-of-freedom gear mechanism having a first axis and including at least four rotating members that are associated to rotate about the first axis and include a first rotating member and a second rotating member, the two degree-of-freedom gear mechanism being constructed such that, when rotation conditions of any two of the at least four rotating members are determined, rotation conditions of the remainder of the at least four rotating members are determined depending thereon, the two degree-of-freedom gear mechanism being adapted for receiving power input from a prime power source and delivering power output from the two degree-of-freedom gear mechanism;

a first motor/generator having a second axis aligned with the first axis, the first motor/generator being disposed between the two degree-of-freedom gear mechanism and the prime power source and drivingly connected with the first rotating member of the two degree-of-freedom gear mechanism; and a second motor/generator having a third axis offset from and parallel to the first axis, the second motor/generator being drivingly connected with the second rotating member of the two degree-of-freedom gear mechanism via a shaft extending from the second rotating member in such a direction as to come away from the prime power source.

In a still further aspect of the invention, there is provided a hybrid transmission connected with a prime power source, the hybrid transmission comprising:

an input member for receiving power input from the prime power source;

a two degree-of-freedom gear mechanism having a first axis and including at least four rotating members that are associated to rotate about the first axis and include a first rotating member and a second rotating member, the two degree-of-freedom gear mechanism being connected with the input member and constructed such that, when rotation conditions of any two of the at least four rotating members are determined, rotation conditions of the remainder of the at least four rotating members are determined depending thereon;

a first motor/generator having a second axis aligned with the first axis of the two degree-of-freedom gear mechanism, the first motor/generator being drivingly connected with the first rotating member of the two degree-of-freedom gear mechanism; and a second motor/generator having a third axis offset from and parallel to the first axis, the second motor/generator being drivingly connected with the second rotating member of the two degree-of-freedom gear mechanism.

DETAILED DESCRIPTION OF THE INVENTION

Figure 1A:
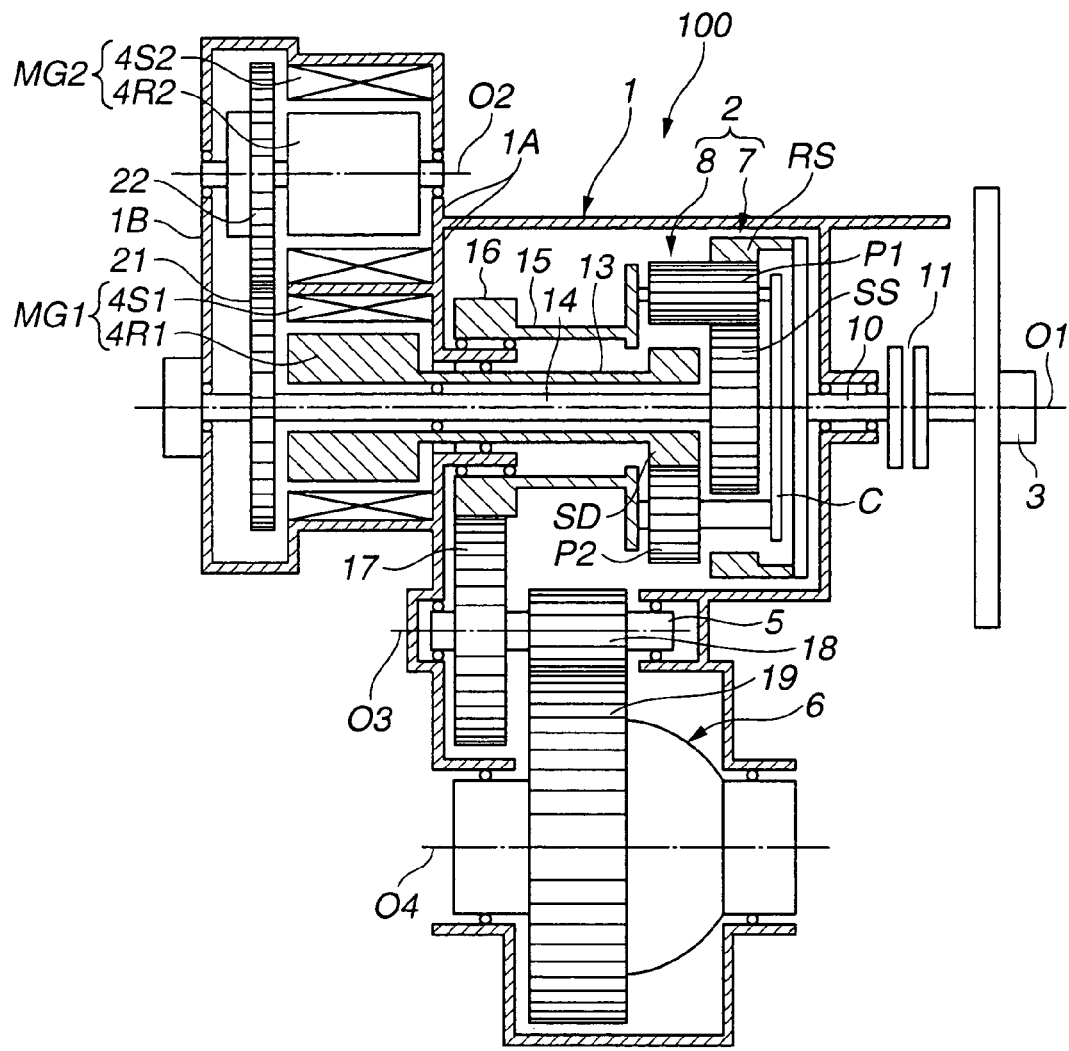
FIG. 1A is a schematically developed and longitudinal cross-sectional view of a hybrid transmission according to a first embodiment of the present invention.

Referring to FIG. 1A, a hybrid transmission according to a first embodiment of the present invention now is explained. In this embodiment, the hybrid transmission is applied to a transaxle for a front-engine front-drive (FF) vehicle.

Hybrid transmission 100 includes transmission case 1 through which axis O1 extends, two degree-of-freedom gear mechanism 2, first motor/generator MG1 and second motor/generator MG2 which are installed in transmission case 1 along axis O1. As illustrated in FIG. 1A, two degree-of-freedom gear mechanism 2 is disposed on the right side as viewed in the figure in a direction of axis O1, and first and second motor/generators MG1 and MG2 are disposed on the left side as viewed in the figure in the direction of axis O1. Engine 3 acting as a prime power source is disposed on the outside of transmission case 1 and located on the right side of two degree-of-freedom gear mechanism 2 as shown in FIG. 1A. In FIG. 1A, there is shown only a crankshaft of engine 3 for the purpose of simple illustration.

Figure 6:
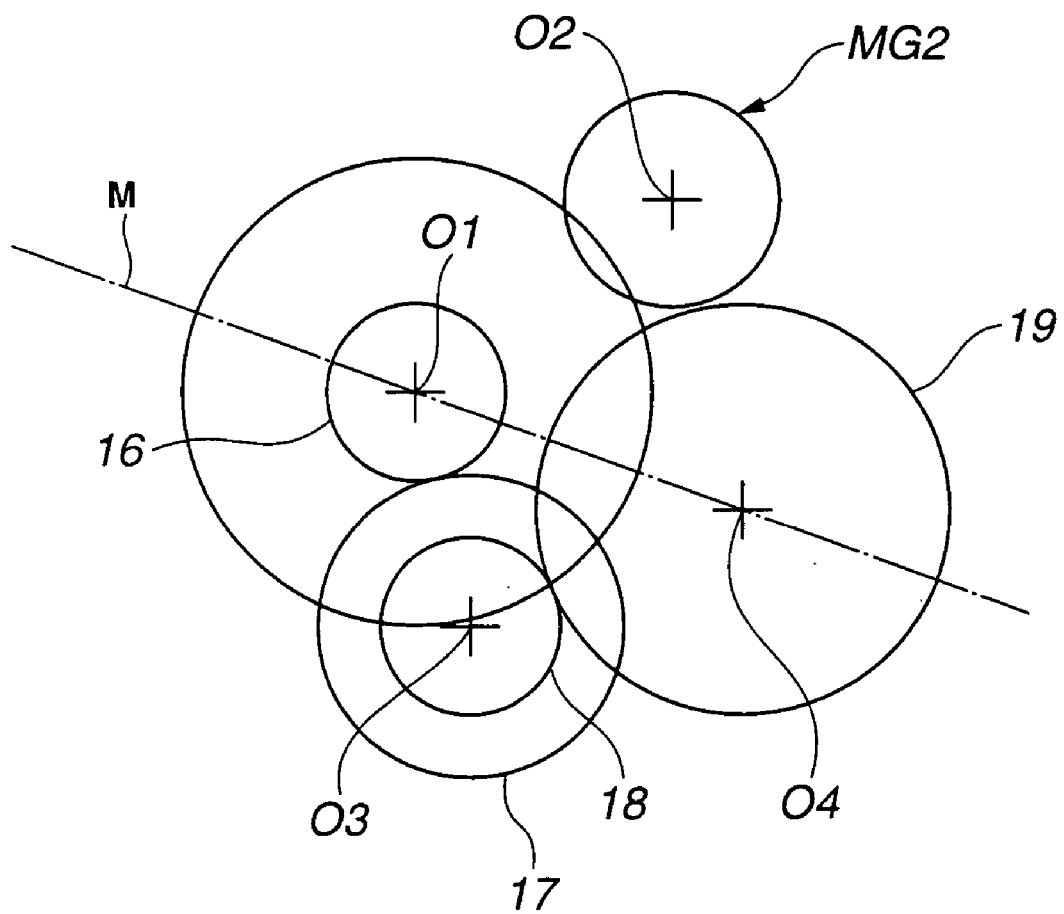
FIG. 6 is an explanatory diagram, as viewed from a direction of an axis of the hybrid transmission, showing an arrangement of components of the hybrid transmission which is common to the first through fifth embodiments.

Two degree-of-freedom gear mechanism 2, engine 3 and first motor/generator MG1 are arranged coaxially with hybrid transmission 100. Namely, two degree-of-freedom gear mechanism 2, engine 3 and first motor/generator MG1 are arranged such that axes thereof are aligned with axis O1 of hybrid transmission 100. In contrast, second motor/generator MG2 is arranged in non-concentrical relation to first motor/generator MG1. Specifically, second motor/generator MG2 is arranged offset from first motor/generator MG1 such that axis O2 of second motor/generator MG2 is offset from the axis of first motor/generator MG1, namely, axis O1, in parallel relation thereto. Countershaft 5 having axis O3 and differential 6 having axis O4 are disposed within transmission case 1 in such a manner that axis O3 and axis O4 are offset from axis O1 in parallel relation thereto. FIG. 6 illustrates an arrangement of axes O1–O4. As shown in FIG. 6, axis O2 of second motor/generator MG2 and axis O3 of countershaft 5 are positioned on both sides of plane M which contains axis O1 of hybrid transmission 100 and axis O4 of differential 6. Thus, second motor/generator MG2 is arranged in opposed relation to countershaft 5 with respect to plane M. In FIG. 6, reference numeral 16 denotes an output gear which is arranged coaxially with hybrid transmission 100 and has a rotation axis aligned with axis O1. Reference numeral 17 denotes a counter gear supported on countershaft 5. Reference numeral 18 denotes a final drive pinion integrally formed with countershaft 5. Reference numeral 19 denotes a final drive ring gear provided on differential 6.

Two degree-of-freedom gear mechanism 2 includes at least four rotating members that are associated to rotate about the axis, i.e., axis O1. Two degree-of-freedom gear mechanism 2 is constructed such that, when rotation conditions of any two of the at least four rotating members are determined, rotation conditions of the remainder of the at least four rotating members are determined depending thereon. In this embodiment, two degree-of-freedom gear mechanism 2 is formed by a compound planetary gear set of a Ravigneaux type. Namely, the Ravigneaux compound planetary gear set is a combination of single-pinion planetary gear set 7 and double-pinion planetary gear set 8 in which pinion P1 and ring gear RS are common. Single-pinion planetary gear set 7 is located closer to engine 3 than double-pinion planetary gear set 8 is. Single-pinion planetary gear set 7 includes sun gear SS and ring gear RS, with which common pinion P1 meshes. Double-pinion planetary gear set 8 includes sun gear SD and short pinion P2 having a diameter larger than common pinion P1. Short pinion P2 meshes with sun gear SD and common pinion P1. Pinions P1 and P2 are rotatably supported by common carrier C.

Figure 1B:
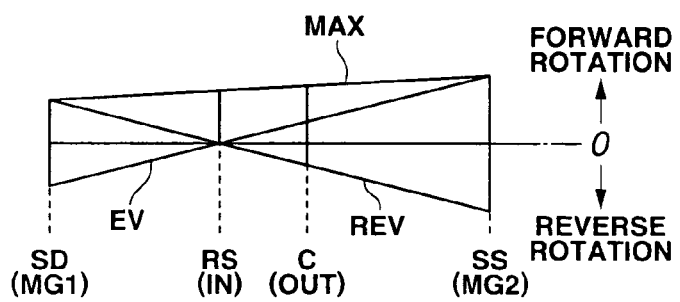
FIG. 1B is a lever diagram of the hybrid transmission of FIG. 1A.

Two degree-of-freedom gear mechanism 2 includes the four rotating members acting as four primary elements, i.e., sun gear SS, sun gear SD, ring gear RS and carrier C. FIG. 1B is a lever diagram showing a relationship between rotation speeds and rotation directions of the four rotating members. As shown in FIG. 1B, the rotation speeds of the four rotating members are in the following order: sun gear SD, ring gear RS, carrier C and sun gear SS.

As illustrated in FIG. 1A, first motor/generator MG1 includes first rotor 4R1 disposed in transmission case 1 so as to be rotatable about axis O1, and first annular stator 4S1 surrounding first rotor 4R1 and fixed to transmission case 1. Second motor/generator MG2 includes second rotor 4R2 disposed within transmission case 1 so as to be rotatable about axis O2, and second annular stator 4S2 surrounding second rotor 4R2 and fixed to transmission case 1. First and second motor/generators MG1 and MG2 are substantially aligned with each other with respect to same plane perpendicular to axes O1 and O2. Specifically, each of first and second motor/generators MG1 and MG2 has a front end which is located on the side of engine 3 and supported by intermediate wall 1A of transmission case 1. A rear end of each of first and second motor/generators MG1 and MG2 is opposed to rear cover 1B of transmission case 1 which closes a rear end opening of transmission case 1.

When an electric current is supplied to stator 4S1 and 4S2 of each of first and second motor/generators MG1 and MG2 to thereby rotate rotor 4R1 and 4R2 thereof, motor/generator MG1 and MG2 operates as a motor producing a rotation output having a direction and a speed (including zero) which correspond on the electric current supplied. On the other hand, when each of rotors 4R1 and 4R2 generates an electric current in stator 4S1 and 4S2 in response to an external rotation input, each of first and second motor/generators MG1 and MG2 operates as a generator producing an electric power corresponding to the external rotation input.

As shown in FIG. 1B, sun gear SD, ring gear RS, carrier C and sun gear SS of two degree-of-freedom gear mechanism 2 are connected with first motor/generator MG1 (first rotor 4R1), input IN from engine 3, output OUT to a wheel driving system and second motor/generator MG2 (second rotor 4R2), respectively. Specifically, as illustrated in FIG. 1A, ring gear RS is connected to transmission input shaft 10, serving as an input element to which rotation from engine 3 is input. Transmission input shaft 10 is drivingly connected to engine 3 via clutch 11. Sun gear SD is drivingly connected with first rotor 4R1 of first motor/generator MG1 via hollow shaft 13 extending toward an opposite side of engine 3. Sun gear SS is drivingly connected with second rotor 4R2 of second motor/generator MG2 via central shaft 14 extending through an inside of hollow shaft 13. Hollow shaft 13 and central shaft 14 are disposed concentrically with axis O1.

Central shaft 14 extends from sun gear SS in such a direction as to come away from input shaft 10 and engine 3 through hollow shaft 13 and first rotor 4R1 of first motor/generator MG1. There is a clearance between a circumferential outer surface of central shaft 14 and circumferential inner surfaces of hollow shaft 13 and first rotor 4R1. Central shaft 14 projects into rear cover 1B of transmission case 1. Central shaft 14 and sun gear SS are drivingly connected with second rotor 4R2 via a transmitting device. The transmitting device is a gear train constituted of two gears 21 and 22 which have different diameters. Gear 21 is provided on an end portion of central shaft 14 which projects from one axial end of first rotor 4R1 toward rear cover 1B. Gear 22 meshing with gear 21 is provided on an end portion of a central shaft of second rotor 4R2 of second motor/generator MG2 which projects from one axial end of second rotor 4R2 into rear cover 1B.

Carrier C is drivingly connected with output gear 16 via hollow connecting member 15 which concentrically extends over hollow shaft 13 and acts as an output shaft. Carrier C serves as an output element delivering the rotation output to the wheel driving system. Output gear 16 is rotatably disposed within transmission case 1 and arranged between two degree-of-freedom gear mechanism 2 and first motor/generator MG1 in the direction of axis O1. Output gear 16 meshes with counter gear 17 supported on countershaft 5. Countershaft 5 has integral final drive pinion 18 meshing with final drive ring gear 19 provided on differential 6.

The rotation output from output gear 16 is transmitted to the wheel driving system. Specifically, the rotation is transmitted to differential 6 via counter gear 17 and a final drive gear set constituted of final drive pinion 18 and final drive ring gear 19. The rotation output from differential 6 is distributed to left and right driving wheels, not shown.

Thus-constructed hybrid transmission 100 operates as follows. As indicated by lever EV shown in FIG. 1B, when a forward or positive rotation output is transmitted, first and second motor/generators MG1 and MG2 operate as motors to produce a power output for driving the vehicle without depending on the power output from engine 3. In this case, the electrical running of the vehicle can be attained only using the power of motor/generators MG1 and MG2.

Next, as indicated by lever MAX shown in FIG. 1B, when the positive rotation speed of motor/generators MG1 and MG2 and the rotation speed of ring gear RS, namely, the rotation output from engine 3, are increased to the largest possible values, respectively, the rotation output from carrier C is enhanced to a maximum.

Further, as indicated by lever REV shown in FIG. 1B, when first motor/generator MG1 operates in the positive rotation direction and second motor/generator MG2 operates in a reverse rotation direction, the reverse rotation output is transmitted from carrier C to the wheel driving system.

As described above, in hybrid transmission 100 of this embodiment, first motor/generator MG1 is arranged coaxially with two degree-of-freedom gear mechanism 2 and hybrid transmission 100, and drivingly connected with the rotating member of two degree-of-freedom gear mechanism 2, i.e., sun gear SD of double-pinion planetary gear set 8 of compound planetary gear set 2, via hollow shaft 13. Second motor/generator MG2 is arranged such that axis O2 thereof is offset from axis O1 in parallel relation thereto, and drivingly connected with the rotating member of two degree-of-freedom gear mechanism 2, i.e., sun gear SS of single-pinion planetary gear set 7 of compound planetary gear set 2, via central shaft 14 which extends through hollow shaft 13 and first rotor 4R1 of first motor/generator MG1. Two degree-of-freedom gear mechanism 2 is disposed between first and second motor/generators MG1 and MG2 and input shaft 10 connected with engine 3. Input shaft 10 and engine 3 are located on one side of two degree-of-freedom gear mechanism 2 in the direction of axis O1, and two motor/generators MG1 and MG2 are located on an opposite side of two degree-of-freedom gear mechanism 2 in the direction of axis O1. Thus-constructed hybrid transmission 100 has the following effects.

With the offset arrangement, two motor/generators MG1 and MG2 are prevented from being juxtaposed to each other in the direction of axis O1. This can avoid increase in dimension in the axial direction of hybrid transmission 100 to thereby prohibit deterioration in the installation ability to a vehicle body. Further, second motor/generator MG2 can be free from being supported in a cantilever form so that hybrid transmission 100 can be prevented from lacking the rigidity. Furthermore, two motor/generators MG1 and MG2 are arranged in substantially alignment with each other with respect to the same plane perpendicular to axis O1. The axial end of each of rotors 4R1 and 4R2 of motor/generators MG1 and MG2 which is located on the side of engine 3, is supported on intermediate wall 1A of transmission case 1. With the arrangement, the mounting strength of first and second motor/generators MG1 and MG2 can be enhanced, whereby the rigidity of hybrid transmission 100 can be increased.

Further, as illustrated in FIG. 6, second motor/generator MG2 and counter gear 17 and final drive pinion 18, namely, countershaft 5, are arranged on both sides of plane M which contains axis O1 of hybrid transmission 100, namely, the axis of output shaft 15, and axis O4 of differential 6, namely, the axis of final drive ring gear 19. This allows a well-balanced layout of the components of hybrid transmission 100 in the space on both sides of plane M, serving for reducing a radial size of hybrid transmission 100. Further, the weight balance of hybrid transmission 100 on both sides of plane M can be improved so that the installation stability can be enhanced.

Further, as shown in FIG. 1A, central shaft 14 connected with sun gear SS and second rotor 4R2 of second motor/generator MG2 are drivingly connected with each other via the gear train constituted of gears 21 and 22. By suitably selecting the gear ratio of gears 21 and 22, the degree of freedom of choice of second motor/generator MG2 can be increased. Furthermore, the suitable selection of the gear ratio allows reduction of a diameter of the shaft of second motor/generator MG2, serving for realizing further reduction of the radial dimension of hybrid transmission 100.

Figure 2:
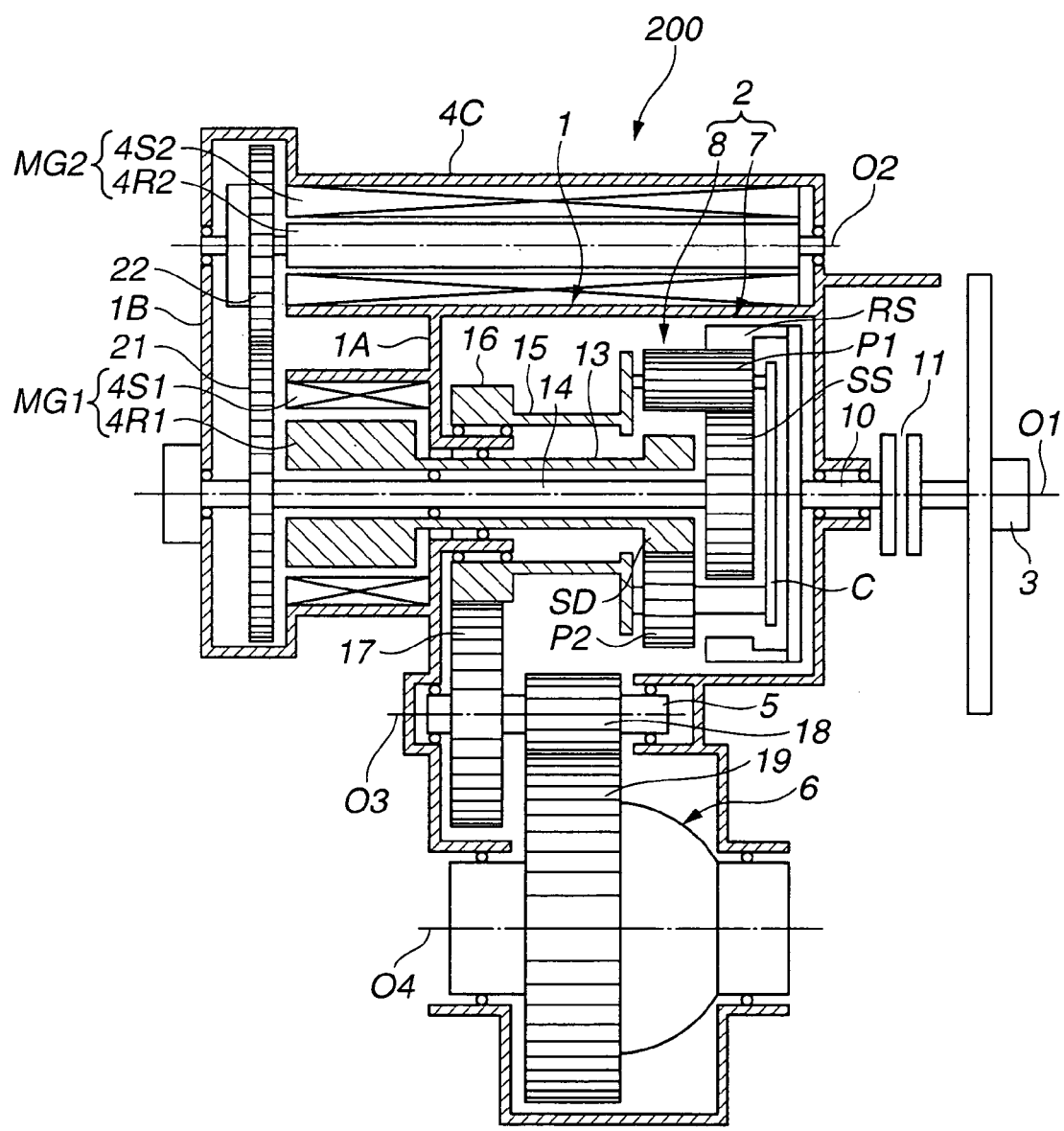
FIG. 2 is a view similar to FIG. 1A, but showing a hybrid transmission according to a second embodiment of the present invention.

Referring to FIG. 2, there is shown the hybrid transmission of a second embodiment of the present invention. The second embodiment differs in construction of first and second motor/generators MG1 and MG2 from the first embodiment. Like reference numerals and letters denote like parts, and therefore, detailed explanations therefor are omitted. As illustrated in FIG. 2, hybrid transmission 200 includes first motor/generator MG1 as explained in the first embodiment, and second motor/generator MG2 having an axial length longer than that of first motor/generator MG1 and a diameter smaller than that of first motor/generator MG1. The axial length of second motor/generator MG2 is not longer than the axial length of hybrid transmission 200. Second motor/generator MG2 includes second rotor 4R2 rotatably supported on transmission case 1 and annular second stator 4RS fixed to transmission case 1. Second stator 4RS is enclosed in motor/generator casing 4C of transmission case 1 which is integrally formed with transmission case 1.

In this embodiment, the bearing span of second rotor 4R2 of second motor/generator MG2 is increased so that mounting rigidity of second motor/generator MG2 can be enhanced as compared with the first embodiment. Further, motor/generator casing 4C accommodating second motor/generator MG2 having the longer axial length is elongated so as to overlap that of transmission case 1. This can increase the rigidity of transmission case 1. Further, second motor/generator MG2 having the smaller diameter can be enhanced in response, and serves for reducing the diameter of hybrid transmission 200 to thereby render hybrid transmission 200 more compact in size. Furthermore, second motor/generator MG2 having the axial length which is not longer than that of hybrid transmission 200 can be prohibited from interfering with engine 3.

Figure 3:
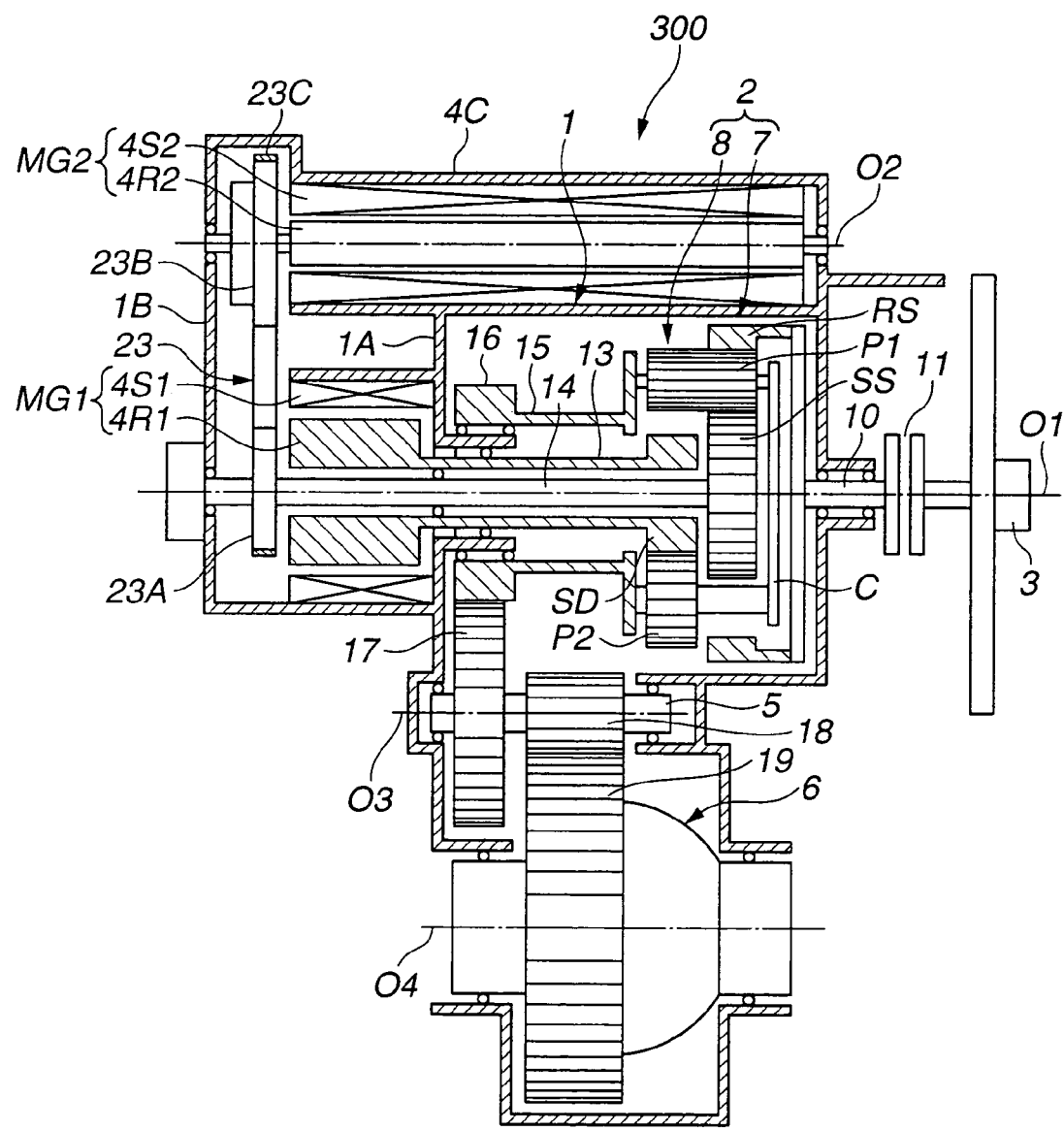
FIG. 3 is a view similar to FIG. 2, but showing a hybrid transmission according to a third embodiment of the present invention.

Referring to FIG. 3, there is shown the hybrid transmission of a third embodiment of the present invention. The third embodiment differs in that a wrapping connector driving member is used as a transmitting device for drivingly connecting central shaft 14 extending from sun gear SS with second rotor 4R2 of second motor/generator MG2, from the second embodiment using the gear train including gears 21 and 22. As illustrated in FIG. 3, hybrid transmission 300 includes wrapping connector driving member 23 such as belt or chain 23C wrapped around two wheels 23A and 23B. Wheel 23A is provided on the end portion of central shaft 14 which projects from the axial end of first rotor 4R1 into rear cover 1B. Wheel 23B is provided on the end portion of the central shaft of second rotor 4R2 which projects from the axial end of second rotor 4R2 into rear cover 1B.

Figure 4:
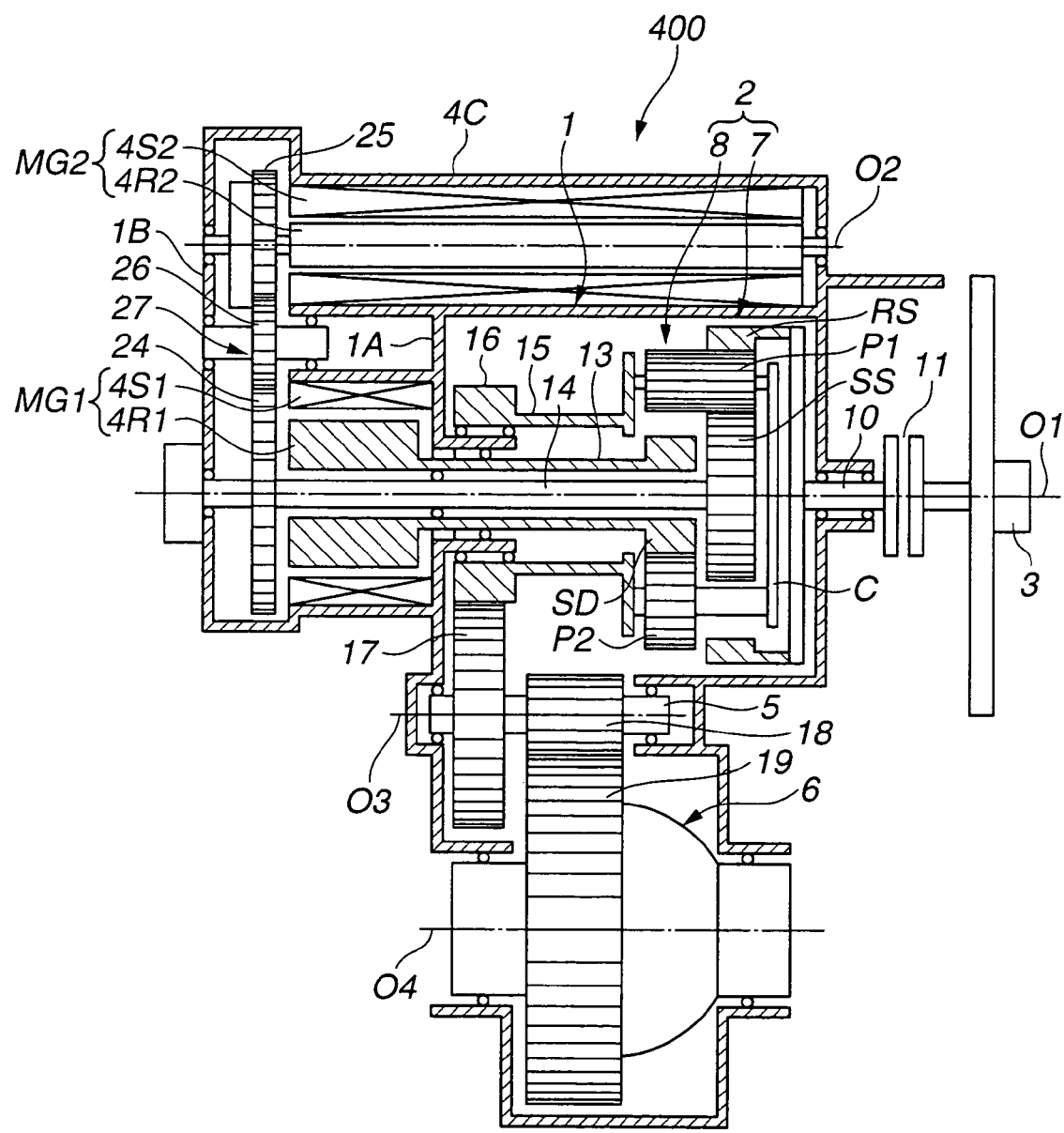
FIG. 4 is a view similar to FIG. 2, but showing a hybrid transmission according to a fourth embodiment of the present invention.

Referring to FIG. 4, there is shown the hybrid transmission of a fourth embodiment of the present invention. The fourth embodiment differs in structure of the gear train serving as the transmitting device for drivingly connecting central shaft 14 and sun gear SS with second rotor 4R2 of second motor/generator MG2, from the second embodiment. As illustrated in FIG. 3, hybrid transmission 300 includes gear train 27 constituted of three gears 24, 25 and 26. Gear 24 is provided on the end portion of central shaft 14 which projects from the axial end of first rotor 4R1 into rear cover 1B. Gear 25 is connected with the end portion of the central shaft which projects from the axial end of second rotor 4R2 into rear cover 1B. Idler gear 26 is interposed between gears 24 and 25 in meshing engagement therewith.

In the third embodiment using wrapping connector driving member 23 and the fourth embodiment using gear train 27, the gear ratio can be set in a wide range as compared with the first and second embodiments. This results in the following effects. Specifically, in a case where second motor/generator MG2 having a relatively small diameter is used, the distance between axis O1 of first motor/generator MG1 and axis O2 of second motor/generator MG2 becomes smaller. In this case, if the gear train including gears 21 and 22 of the first and second embodiments is used, a sufficient gear ratio may not be obtained. In contrast, if wrapping connector driving member 23 of the third embodiment and gear train 27 of the fourth embodiment are used, a desired gear ratio can be realized over a wide range. This serves for further increasing a degree of freedom of selecting second motor/generator MG2.

Figure 5A:
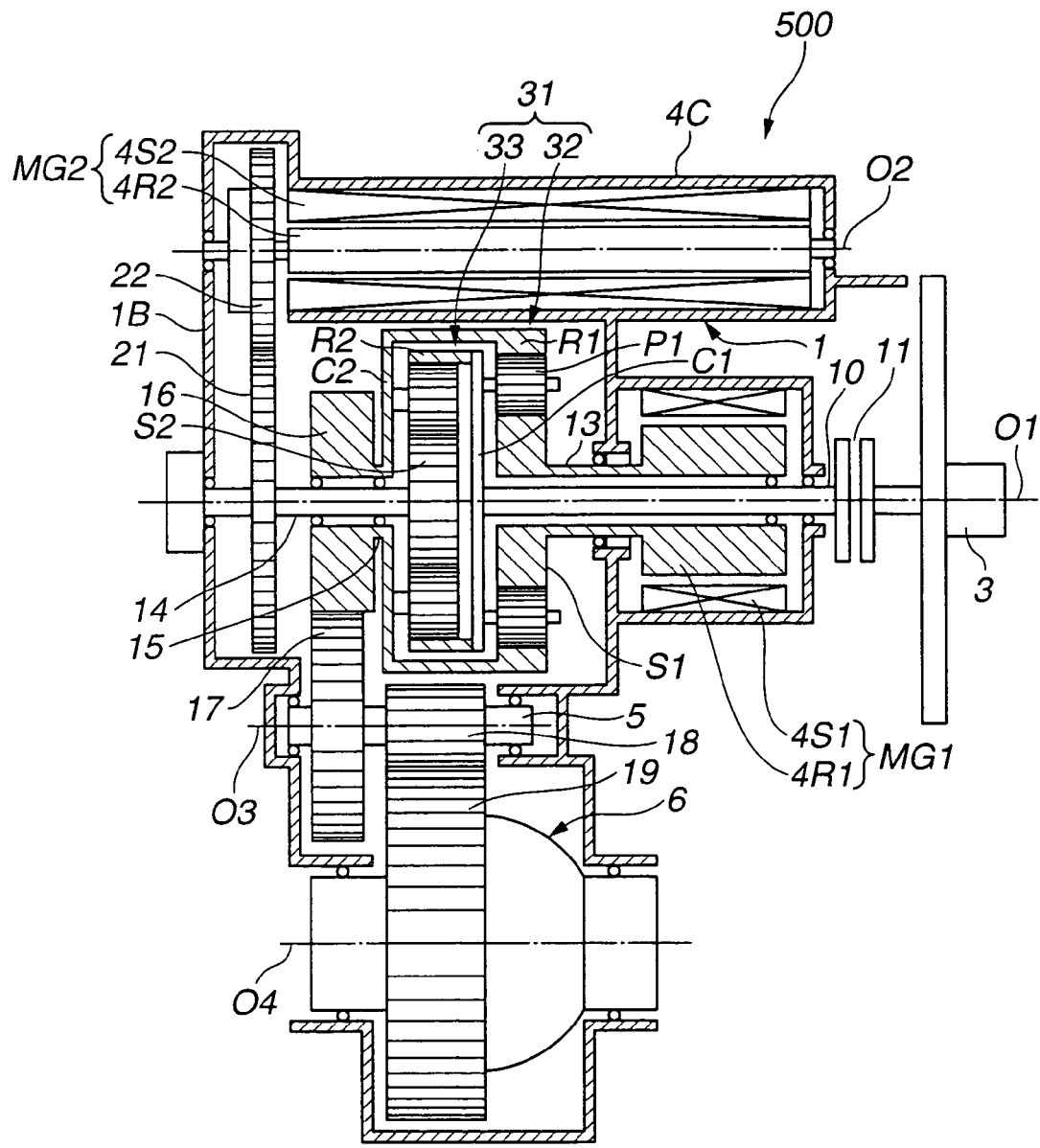
FIG. 5A is a view similar to FIG. 2, but showing a hybrid transmission according to a fifth embodiment of the present invention.

Referring to FIG. 5A, there is shown the hybrid transmission of a fifth embodiment of the present invention. The fifth embodiment differs in layout of the first motor/generator and the two degree-of-freedom gear mechanism from the second embodiment. As illustrated in FIG. 5A, hybrid transmission 500 includes first motor/generator MG1 disposed on the right side as viewed in the figure in the direction of axis O1 and two degree-of-freedom gear mechanism 31 disposed on the left side as viewed in the figure in the direction of axis O1. Specifically, first motor/generator MG1 is disposed between two degree-of-freedom gear mechanism 31 and input shaft 10 connected with engine 3 in the direction of axis O1. Input shaft 10 and engine 3 are located on one side of first motor/generator MG1. Two degree-of-freedom gear mechanism 31 is located on an opposite side of first motor/generator MG1. Two degree-of-freedom gear mechanism 31, engine 3 and first motor/generator MG1 are arranged coaxially with hybrid transmission 500. Namely, two degree-of-freedom gear mechanism 2, engine 3 and first motor/generator MG1 are arranged such that axes thereof are aligned with axis O1 of hybrid transmission 500. Second motor/generator MG2 is arranged offset from first motor/generator MG1 such that axis O2 of second motor/generator MG2 is non-concentric with and parallel to axis O1, namely, the axis of first motor/generator MG1. The arrangement of axes O1 and O2 and axis O3 of countershaft 5 and axis O4 of differential 6 is the same as the arrangement thereof in the first through fourth embodiments as shown in FIG. 6. Second motor/generator MG2 is located on one side of plane M, and countershaft 5 is located on an opposite side of plane M.

Two degree-of-freedom gear mechanism 31 includes two simple planetary gear sets 32 and 33 arranged coaxially with hybrid transmission 500. Axes of simple planetary gear sets 32 and 33 are aligned with axis O1 of hybrid transmission 500. Simple planetary gear set 32 is disposed on a front side close to engine 3, and simple planetary gear set 33 is disposed on a rear side away from engine 3. Simple planetary gear set 32 includes sun gear S1, ring gear R1 and carrier C1 with pinions P1 meshing with sun gear S1 and ring gear R1. Simple planetary gear set 33 includes sun gear S2, ring gear R2 and carrier C2 with pinions meshing with sun gear S2 and ring gear R2. Carrier C1 of planetary gear set 32 is drivingly connected with ring gear R2 of planetary gear set 33. Carrier C2 of planetary gear set 33 is drivingly connected with ring gear R1 of planetary gear set 32. Planetary gear sets 32 and 33 are thus associated with each other.

Figure 5B:
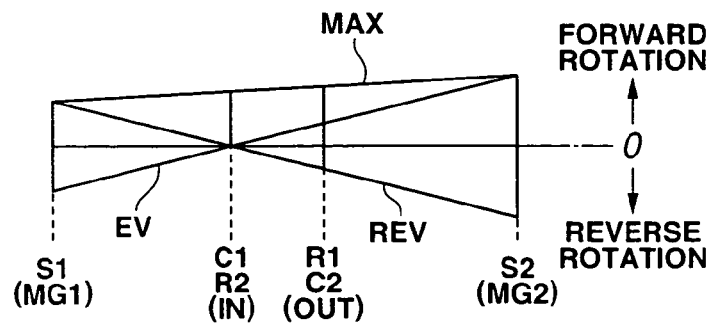
FIG. 5B is a lever diagram of the hybrid transmission of FIG. 5A.

In this embodiment, two degree-of-freedom gear mechanism 31 includes four rotating members, i.e., sun gear S1, sun gear S2, carrier C1 (ring gear R2), and ring gear R1 (carrier C2), acting as primary elements. FIG. 5B shows a relationship between rotation speeds and rotation directions of the four rotating members. As shown in FIG. 5B, the rotation speeds of the four rotating members are in the following order: sun gear S1, carrier C1 (ring gear R2), ring gear R1 (carrier C2), and sun gear S2.

As shown in FIG. 5B, sun gear S1, carrier C1 (ring gear R2), ring gear R1 (carrier C2) and sun gear S2 of two degree-of-freedom gear mechanism 31 are connected with first motor/generator MG1 (first rotor 4R1), input IN from engine 3, output OUT to a wheel driving system and second motor/generator MG2 (second rotor 4R2), respectively. Specifically, as illustrated in FIG. 5A, carrier C1 and ring gear R2 connected with carrier C1 are connected to transmission input shaft 10. Carrier C1 and ring gear R2 serve as an input element indicated by IN in FIG. 5B, to which the rotation from engine 3 is input. Transmission input shaft 10 is disposed coaxially with the crankshaft of engine 3 and drivingly connected with the crankshaft via clutch 11. Sun gear S1 is drivingly connected with first rotor 4R1 of first motor/generator MG1 via hollow shaft 13 extending from sun gear S1 toward engine 3. Transmission input shaft 10 extends through sun gear S1, hollow shaft 13 and first rotor 4R1 with a clearance between a circumferential outer surface thereof and circumferential inner surfaces of sun gear S1, hollow shaft 13 and first rotor 4R1. Sun gear S2 is drivingly connected with second rotor 4R2 of second motor/generator MG2 via central shaft 14 extending from sun gear S2 in a direction toward an opposite side of engine 3. Similar to the first embodiment, the driving connection between sun gear S2 and second rotor 4R2 is established by the gear train constituted of gears 21 and 22 which have different diameters and mutually mesh with each other. Ring gear R1 and carrier C2 connected with ring gear R1 are connected to output gear 16 via hollow connecting member 15 which is concentrically arranged with central shaft 14 and acts as an output shaft. Ring gear R1 and carrier C2 serve as an output element indicated by OUT in FIG. 5B, which delivers the rotation output to the wheel driving system. Output gear 16 is rotatably supported on central shaft 14 and axially disposed between two degree-of-freedom gear mechanism 31 and the gear train, i.e., gears 21 and 22. Output gear 16 is connected to final drive ring gear 19 via counter gear 17 and final drive pinion 18 provided on countershaft 5.

An operation of thus-constructed hybrid transmission 500 will be explained hereinafter. As indicated by lever EV shown in FIG. 5B, when a forward or positive rotation output is transmitted, first and second motor/generators MG1 and MG2 operate as motors to produce a power output for driving the vehicle without depending on the power output from engine 3. In this case, the electrical running of the vehicle can be attained only using the power of motor/generators MG1 and MG2.

Next, as indicated by lever MAX shown in FIG. 5B, when the positive rotation speed of motor/generators MG1 and MG2 and the rotation speed of carrier C1 and ring gear R2, namely, the rotation output from engine 3, are increased to the largest possible values, respectively, the rotation output from ring gear R1 and carrier C2 is enhanced to a maximum.

Further, as indicated by lever REV shown in FIG. 5B, when first motor/generator MG1 operates in the positive rotation direction and second motor/generator MG2 operates in a reverse rotation direction, the reverse rotation output is transmitted from ring gear R1 and carrier C2 to the wheel driving system.

As explained above, in hybrid transmission 500 of this embodiment, first motor/generator MG1 is arranged coaxially with hybrid transmission 500 and drivingly connected with the rotating member of two degree-of-freedom gear mechanism 31, i.e., sun gear S1 of simple planetary gear set 32, via hollow shaft 13. Second motor/generator MG2 is arranged such that axis O2 thereof is offset from axis O1 in parallel relation thereto, and drivingly connected with the rotating member of two degree-of-freedom gear mechanism 31, i.e., sun gear S2 of simple planetary gear set 33, via central shaft 14 which extends from two degree-of-freedom gear mechanism 31 in such a direction as to come away from engine 3. First motor/generator MG1 is disposed between engine 3 and two degree-of-freedom gear mechanism 31 in the direction of axis O1 as shown in FIG. 5A. Thus-constructed hybrid transmission 500 of the fifth embodiment has the following effects in addition to the same effects as described in the first and second embodiments.

The transmitting device for drivingly connecting sun gear S2 with second rotor 4R2 of second motor/generator MG2 is not limited to the gear train including gears 21 and 22 and may include wrapping connector driving member 23 of the third embodiment and gear train 27 of the fourth embodiment. In such cases, the same effects as described in the third and fourth embodiments can be obtained, respectively.

This application is based on a prior Japanese Patent Application No. 2003-009206 filed on Jan. 17, 2003. The entire contents of the Japanese Patent Application No. 2003-009206 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hybrid transmission comprising:
   a two degree-of-freedom gear mechanism having a first axis and including at least four rotating members that are associated to rotate about the first axis, the at least four rotating members including a first rotating member and a second rotating member, the two degree-of-freedom gear mechanism being constructed such that, when rotation conditions of any two of the at least four rotating members are determined, rotation conditions of the remainder of the at least four rotating members are determined depending thereon, the two degree-of-freedom gear mechanism being adapted for receiving power input from a prime power source and delivering power output from the two degree-of-freedom gear mechanism;
   a first motor/generator having a second axis aligned with the first axis, the first motor/generator being drivingly connected with the first rotating member of the two degree-of-freedom gear mechanism via a hollow shaft; and
   a second motor/generator having a third axis offset from and parallel to the second axis, the second motor/generator being drivingly connected with the second rotating member of the two degree-of-freedom gear mechanism via a central shaft which extends through the hollow shaft and the first motor/generator,
   the first and second motor/generators being disposed on one side of the two degree-of-freedom gear mechanism in a direction of the first axis, the prime power source being disposed on an opposite side of the two degree-of-freedom gear mechanism in the direction of the first axis.

2. The hybrid transmission as claimed in claim 1, wherein the second motor/generator has an axial length extending longer than the first motor/generator.

3. The hybrid transmission as claimed in claim 2, wherein the second motor/generator is smaller in diameter than the first motor/generator.

4. The hybrid transmission as claimed in claim 1, further comprising an output shaft having a fourth axis aligned with the first axis and a final drive gear that has a fifth axis offset from and parallel to the first axis and is drivingly connected with the output shaft via a countershaft parallel to the output shaft, the countershaft being arranged on one side of a plane containing the fourth axis and the fifth axis, the second motor/generator being arranged on an opposite side of the plane.

5. The hybrid transmission as claimed in claim 1, wherein the two degree-of-freedom gear mechanism comprises a compound planetary gear set including a single-pinion planetary gear set and a double-pinion planetary gear set.

6. The hybrid transmission as claimed in claim 5, wherein the first rotating member is a sun gear of the double-pinion planetary gear set, and the second rotating member is a sun gear of the single-pinion planetary gear set.

7. The hybrid transmission as claimed in claim 1, further comprising a transmitting device for drivingly connecting the second motor/generator with the central shaft.

8. The hybrid transmission as claimed in claim 7, wherein the transmitting device comprises a gear train.

9. The hybrid transmission as claimed in claim 7, wherein the transmitting device comprises a wrapping connector driving member.

10. A hybrid transmission connected with a prime power source, the hybrid transmission comprising:
   an input member for receiving power input from the prime power source;
   a two degree-of-freedom gear mechanism having a first axis and including at least four rotating members that are associated to rotate about the first axis, the at least four rotating members including a first rotating member and a second rotating member, the two degree-of-freedom gear mechanism being connected with the input member and constructed such that, when rotation conditions of any two of the at least four rotating members are determined, rotation conditions of the remainder of the at least four rotating members are determined depending thereon;
   a first motor/generator having a second axis aligned with the first axis of the two degree-of-freedom gear mechanism, the first motor/generator being drivingly connected with the first rotating member of the two degree-of-freedom gear mechanism;
   a second motor/generator having a third axis offset from and parallel to the first axis, the second motor/generator being drivingly connected with the second rotating member of the two degree-of-freedom gear mechanism; and
   a hollow shaft connecting the first motor/generator with the first rotating member of the two degree-of-freedom gear mechanism, and a central shaft that extends through the hollow shaft and the first motor/generator and connects the second motor/generator with the second rotating member of the two degree-of-freedom gear mechanism;
   wherein the two degree-of-freedom gear mechanism and the first motor/generator are arranged coaxially with the input member, the first and second motor/generators being disposed on one side of the two degree-of-freedom gear mechanism in a direction of the first axis, the input member being disposed on an opposite side of the two degree-of-freedom gear mechanism in the direction of the first axis.

11. A hybrid transmission as claimed in claim 10, wherein the two degree-of-freedom gear mechanism comprises a compound planetary gear set including a single-pinion planetary gear set and a double-pinion planetary gear set.

12. The hybrid transmission as claimed in claim 11, wherein the first rotating member is a sun gear of the double-pinion planetary gear set, and the second rotating member is a sun gear of the single-pinion planetary gear set.

13. The hybrid transmission as claimed in claim 10, further comprising a transmitting device for drivingly connecting the second motor/generator with the central shaft.

* * * * *